(12) United States Patent
Chien

(10) Patent No.: US 7,568,829 B2
(45) Date of Patent: Aug. 4, 2009

(54) POLY NIGHT LIGHT

(76) Inventor: Tseng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 0 days.

(21) Appl. No.: 11/498,881

(22) Filed: Aug. 4, 2006

(65) Prior Publication Data
US 2007/0076438 A1 Apr. 5, 2007

(51) Int. Cl.
*H01R 33/00* (2006.01)
(52) U.S. Cl. ...................... 362/641; 362/644
(58) Field of Classification Search ............ 362/641, 362/644, 652, 653, 657, 658, 659, 554, 555, 362/565, 806
See application file for complete search history.

(56) References Cited

U.S. PATENT DOCUMENTS

| | | | | |
|---|---|---|---|---|
| 3,810,863 A | * | 5/1974 | John et al. ............ | 523/514 |
| 5,307,051 A | * | 4/1994 | Sedlmayr ............ | 340/573.1 |
| 6,207,077 B1 | * | 3/2001 | Burnell-Jones ........ | 252/301.36 |
| 7,186,016 B2 | * | 3/2007 | Jao ...................... | 362/644 |
| 2005/0226006 A1 | * | 10/2005 | Chen .................... | 362/641 |

* cited by examiner

*Primary Examiner*—Bao Q Truong
(74) *Attorney, Agent, or Firm*—Bacon & Thomas, PLLC

(57) ABSTRACT

A poly night light is made of an un-saturated polyester resin (UPR) compound to provide the night light with a certain degree of softness and cushioning to meet quality tests. The poly night light has a molded-in clip that allows the display unit to fit into a lamp holder's connector for solid installation. The lamp holder can be for an incandescent bulb, neon bulb, LED(s), organic electro-luminescent element(s), or other conventional lighting elements. The poly display unit may have a three-dimensional design, shape, curvature, and/or configuration for an eye-catching, valuable appearance and further may be painted by hand or spray paint to make it more elegant than any other currently-marketed night light.

13 Claims, 6 Drawing Sheets

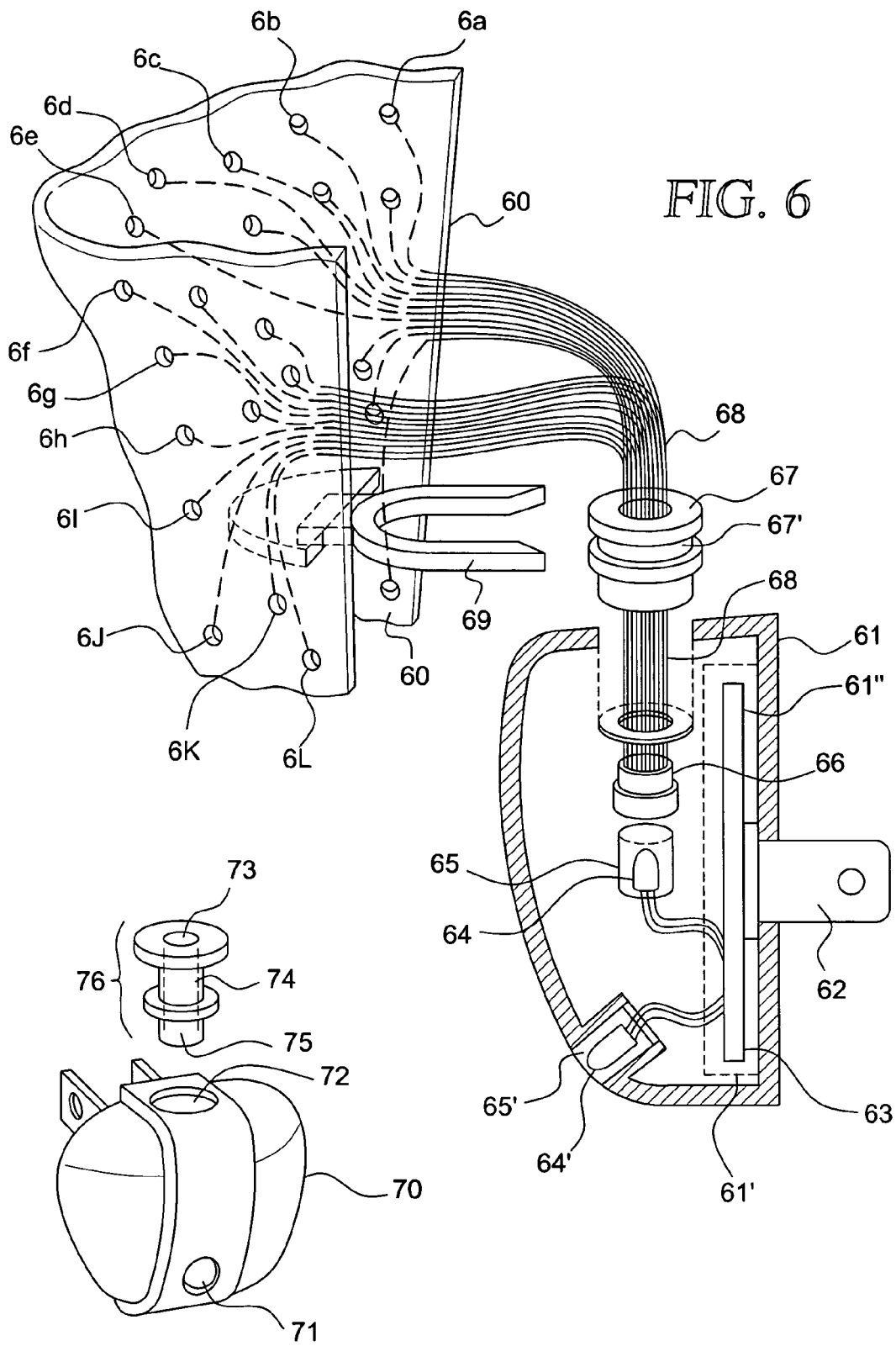

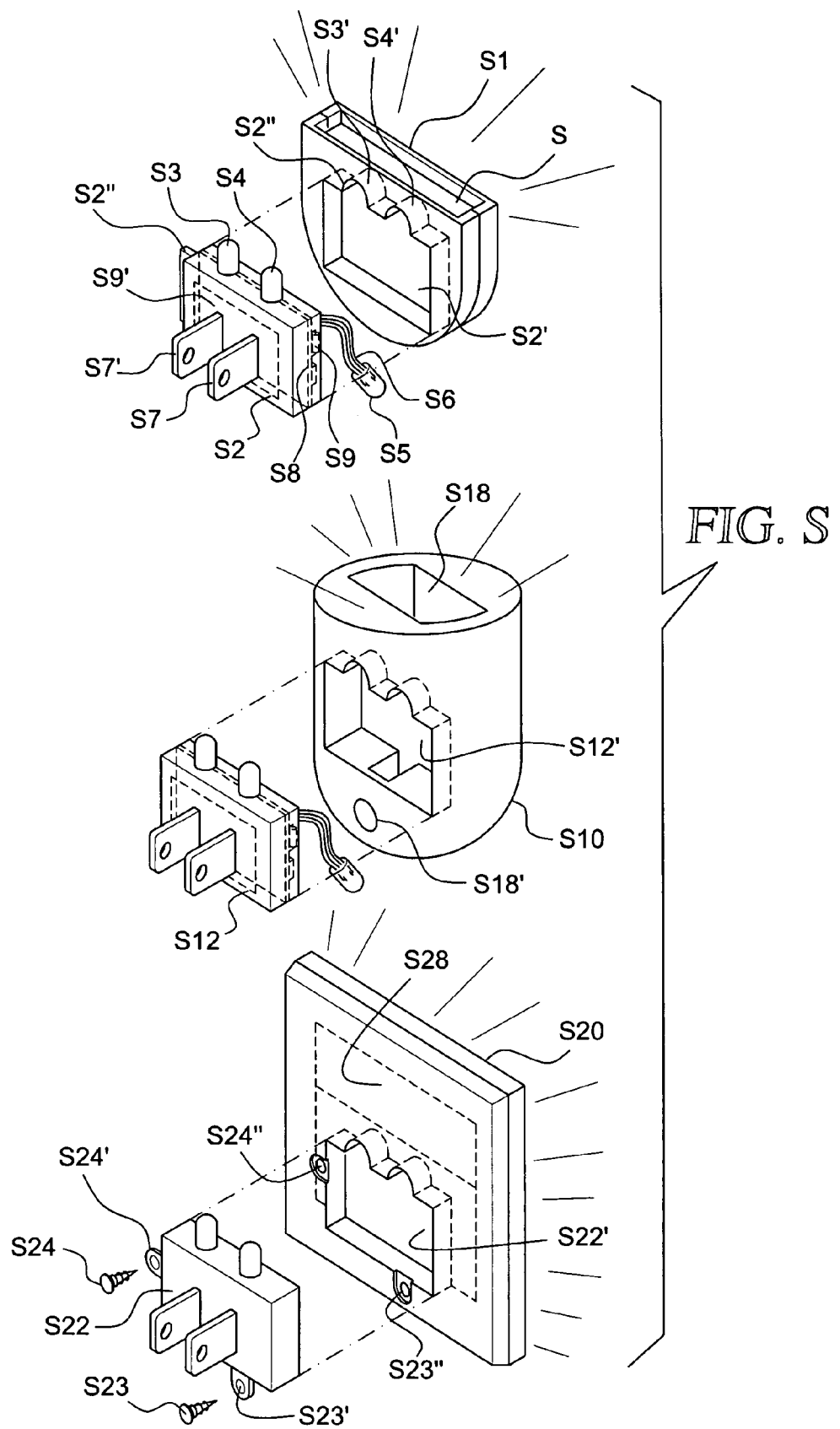

POLY NIGHT LIGHT

This application is related to U.S. patent application Ser. Nos. 10/954,189, filed Oct. 1, 2004; 11/094,155, filed Mar. 31, 2005; 11/094,156, filed Mar. 31, 2005; 10/667,787, 10/286,871; 10/621,513; 11/094,215, filed Mar. 31, 2005; 11/255,981, filed Oct. 24, 2005; 11/527,631, filed Sep. 27, 2006; and 11/527,628, filed Sep. 27, 2006.

BACKGROUND OF THE INVENTION

The current invention provides a very pretty hand-made display unit made by pouring plastic material into tooling to get a three-dimensional lens which cannot be made by the conventional plastic injection process. To accomplish this, the current invention adapts a special compound of polyester (hereafter referred to as "poly") material to make the poly more durable and capable of passing a strict drop test and uses very fine hand painting of the said poly lens to make the lens colorful and enhance the appearance and therefore the value of said display unit.

In addition, the current invention uses a special process to add a clip within the poly material to allow the poly display unit to fit into the incandescent base, light emitting diode (hereinafter referred to as LED) base, or other light means base without any breakage, loosening, or melting problem occurring during long usage.

The current invention may incorporate a variety of light means, including those selected from the group consisting of incandescent lights or LEDs, which may further be incorporated with a light-medium, fiber optics, filtering optical fibers, filter(s), stencil(s), cut-out(s), window(s), overlays, underlays, mask(s), lenses, inks, painting, glue, or any related optic kits which can allow the visible light beams to be seen exhibit desired light effects.

Finally, the current invention may incorporate a special chemical compound to add into the unsaturated polyester resin (hereinafter, UPR) to cause the poly display unit to have a certain degree of softness to cushion against any impact during a drop test, kicking, pulling, pushing and potential damage from the environment.

All of these features of the current invention can make a durable, quality, poly display unit which is different from other conventional poly items. Conventional poly items are brittle, fragile, and cannot pass the drop test from 6 feet or higher. Also, the clip means within the poly display unit is more durable than those of currently marketed items, which use glue to adhere the two different materials, which is very difficult. The lamp holder of the invention fits a variety of different light means with proper design, as will become apparent from the following description.

DRAWINGS

FIG. 2-1 is a schematic illustration of the manner in which the poly night light of the second preferred embodiment incorporates a UPR compound that has been poured into tooling to make the desired curvature, shape, overlay, underlay, double effects which cannot made by the conventional plastic injection process.

FIG. 6 is a preferred view of another preferred embodiment of a poly night light with built-in LED(s), LED circuit, control means, sensor means or other parts to provide illumination and that incorporate fiber optics means to show a plurality of pretty lights on the poly display unit.

FIG. 7 is a perspective view of a separated input-end design to fit into a base and connect with a display area.

FIG. S is a perspective view of a sealed-unit with LEDs constructed to form a universal model that can fit to all kinds of night light devices.

DETAILED DESCRIPTION OF THE PREFERRED EMBODIMENTS

Figure 4:
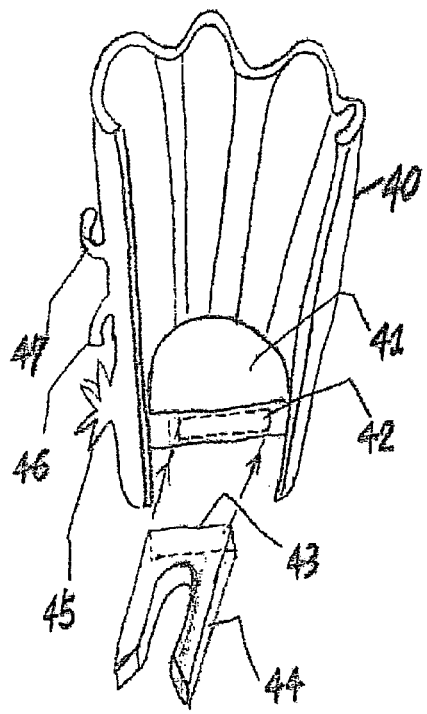
FIG. 4 is a perspective view of a prior art arrangement in which a clip is glued to the poly display.

As shown in FIG. 4, a prior art poly display unit (40) has an inner shelf or platform (41) which has a certain thickness and, as in all prior art displays, uses glue or chemical solvent on the clip's surface (43) to fix the clip (44) on the edge of the poly display area (42). Consequently, the clip needs to be very rigid and durable so that it can provide sufficient impact strength. A preferred material for this purpose is polycarbonate (PC) or else the display will easily be broken whenever the display is twisted. It is very difficult to glue the PC material of the clip and the poly (polyester resin) material of the display together and still pass related bending and torque weight tests, so the prior art is very weak and low in quality.

Figure 5:
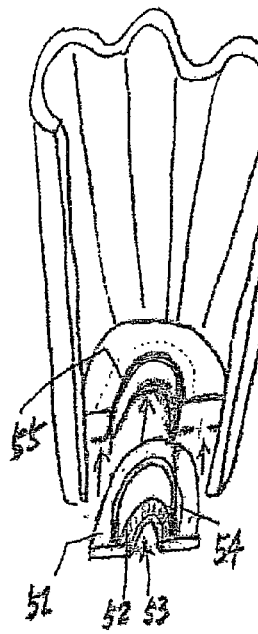
FIG. 5 is a perspective view of a prior art arrangement in which a T-shaped clip is glued to the base of the poly display unit to install on the lamp holder.

As shown in FIG. 5, another prior art arrangement uses a "Reverse T" shape connector (51) to glue the connector's contour (54) to below the area of the shelf or platform (55). The clip means (52) can better hold the lamp holder's neck. However, the clipper-means still requires PC to have enough durable quality. Hence, this prior art still is bad because it is difficult to use glue or solvent to fix the clip means on the bottom of the shelf or platform. This prior art arrangement also has the disadvantage that all weight of the lamp holder will fall on the clip means.

Figure 2:
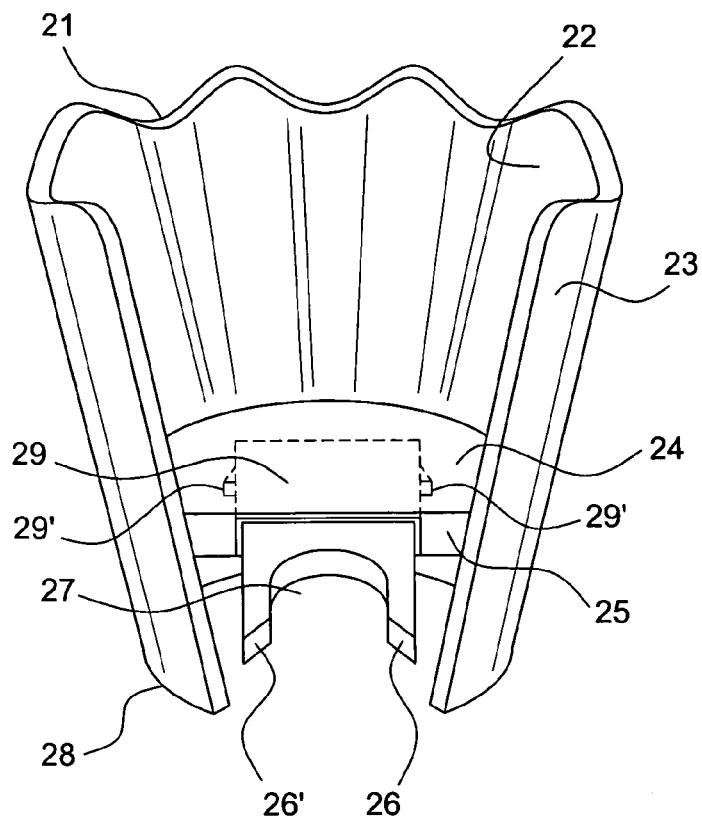
FIG. 2 is a perspective view of a second preferred embodiment of a poly night light which has a clip means sealed within the poly material.
Figures 1, 2:
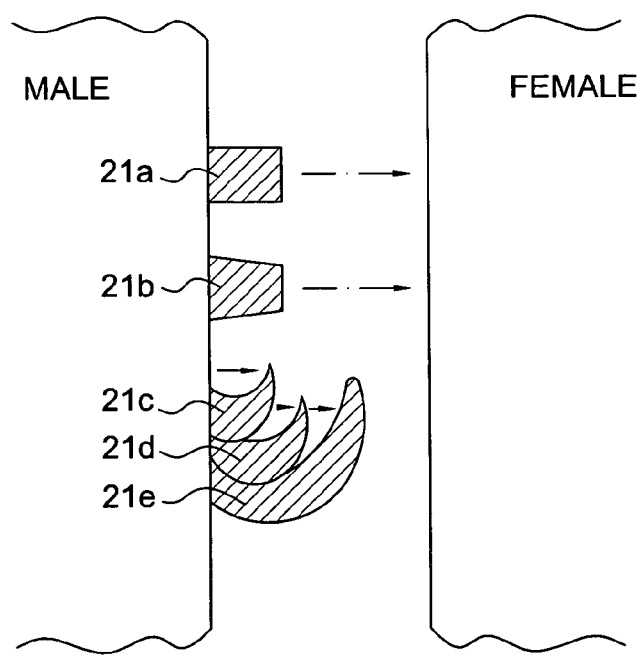

As shown in FIG. 2, the current invention provides the clip means with extension parts (29) that are sealed within the poly display unit (24). The extension parts (29) can have a very rough surface with some raised teeth (29') so it will not able to be pulled out easily. The material of the clip means will be polycarbonate (PC) because it is the most durable material, but the alternative of using a metal piece or other material still falls within the scope of the invention. The clip means material can be selected from the group consisting of any plastic, metal, wood, pottery, or porcelain.

Figure 1:
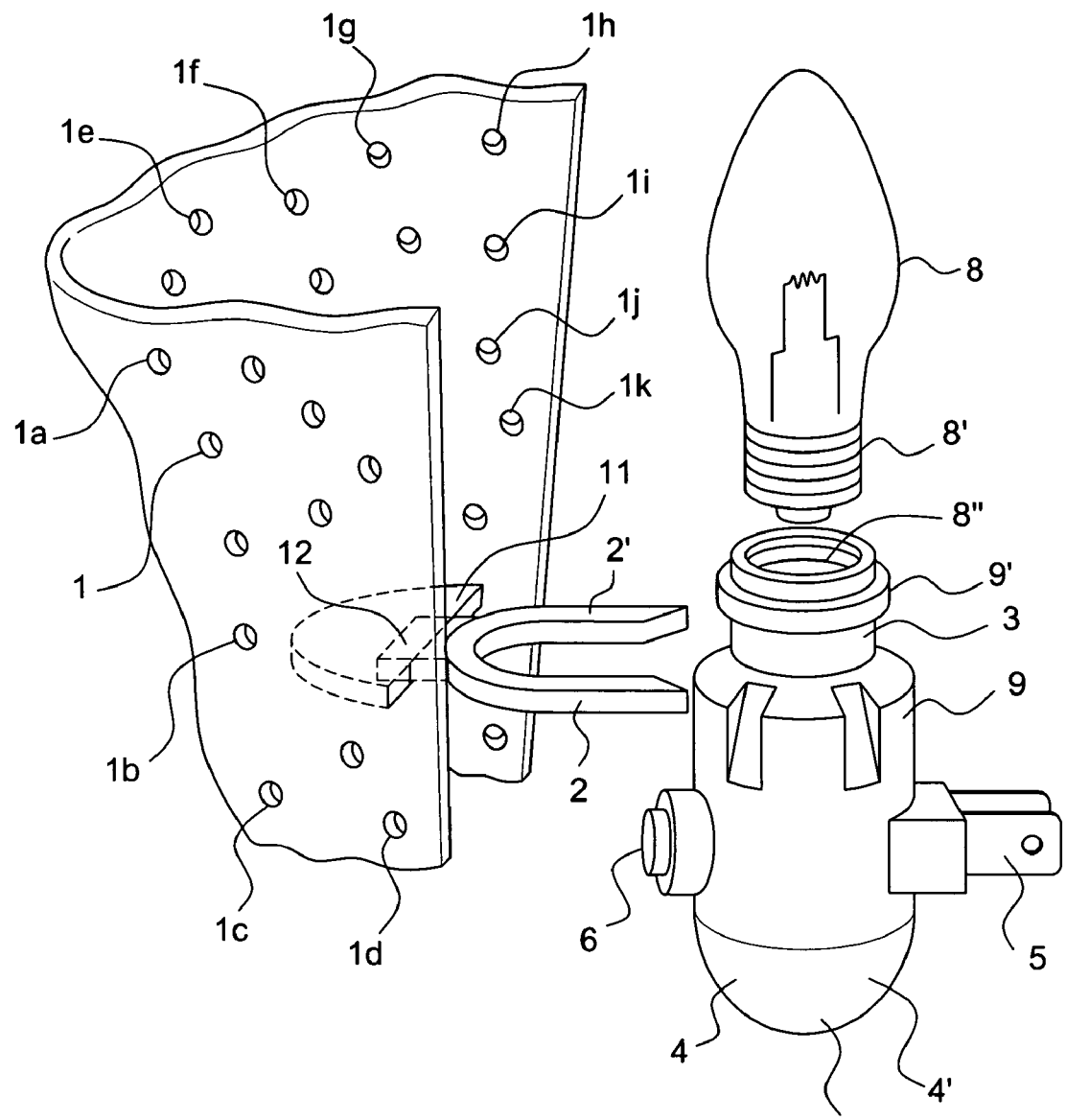
FIG. 1 is a perspective view of a first preferred embodiment of a poly night light with an incandescent bulb.

FIG. 2-1 illustrates a poly pouring process that provides a certain softness and flexible properties so that the process can be used to make designs (21c) (21d) 921e) which are not possible using a plastic injection process. If similar products (21c) (21d) (21e) were to be made in a plastic injection machine, the tooling would need a lot of slide parts so that the tooling would be very expensive and require a larger investment. The plastic injection process only can only create (21a) or (21b) because these parts allow the female tooling to easily move and easily separate from male tooling. However, It is almost impossible to use the injection tooling to get the (21c) (21d) (21e) because these parts have a lot or big block of material, which will prevent the male and female tooling from being separated after injection.

The current invention provides a poly night light which is different from marketplace poly night lights because the current invention has a more durable quality, such that the poly display unit can pass a drop test at least 6 feet or higher without any packing material wrapped around it. The special compound for the current invention not only uses an unsaturated polyester resin (UPR) but also include the following materials: maleic anhydride, propylene glycol, ethylene glycol, diethylene glycol, styrene monomer and/or other special chemicals select from CaCo2, H2O2, Co, Dop, or other content to provide the poly display with a certain degree of softness to allow it to have some cushioning properties against strong impacts applied to the exterior of the display unit. The UPR compound can be poured into tooling to cause the display unit to have a desired design, configuration, and shape. The UPR compound may have some chemical material added to provide the desired softness, clearance, thickness, curing time, and durability to meet market requirements.

As shown in FIG. 1, the poly display unit (1) has a desired shape, configuration, thickness, transparency, and its surface has s desired color, painting, image, design, and/or art to cause people to feel it is elegant with a valuable appearance. FIG. 1 shows that the poly display unit (1) has an inner area, shelf or platform (11) which has a certain thickness to allow the extension part (12) of the clip means (2) to be fit within and sealed by poly material, so that the said extension part can be sealed very solidly without any chance of movement, falling apart, peel off, or separation from the poly display unit. The clip means still needs to be very durable so resist all types of impact or applied forces including pulling, pushing, kicking, twisting, and bending so the clip means (2) is preferably made of polycarbonate (PC), which is the most durable plastic material. any alternative material such as metal, pottery, porcelain, wood or any other material available from the market place will still fall within the scope of the current invention. The clip means has two arms (2') (2') that form a "U" shape to fit into the connector's neck (3) for a very tight fit but which can if desired be rotated to a desired angle. The connector (3) is part of the lamp holder (9) which offers space to allow the clip mean's arms (2) (2') to fit. The lamp holder (9) has a space to allow the light means (8) to be installed and provide illumination when the prong means (5) is connected with the power source (not shown) and the control means (6) is also connected. The prong means (9) can be fixed on the lamp holder or be a swivel type of prong means. The control means may be a switch, photo sensor, motion sensor, PIR sensor, other sensor means, timer, or equivalent control means to cause the circuit to vary "open" and "close" conditions. The lamp holder has a connector to allow the clip means to be fixed on the lamp holder tightly and securely.

As shown in FIG. 1, the poly display unit (1) has a lot of designs, art, painting, and colors on its surface to provide a valuable appearance. The display unit also may have a plurality of window(s), cut-out(s), and opening(s) to allow a fiber optics string to be installed and allow the light beams to be seen by a viewer. Additional features can be provided for light effects. The poly display unit can apply hand painting for colors or use a sprayer for the color painting process. The poly display unit has a certain degree of softness to allow the display unit to absorb impacts for a more durable quality. The poly night light can thus pass the requirements for testing, including the drop test, continuously on test, accumulate temperature test, pulling test, oven test and related tests which are required by the marketplace.

Figure 3:
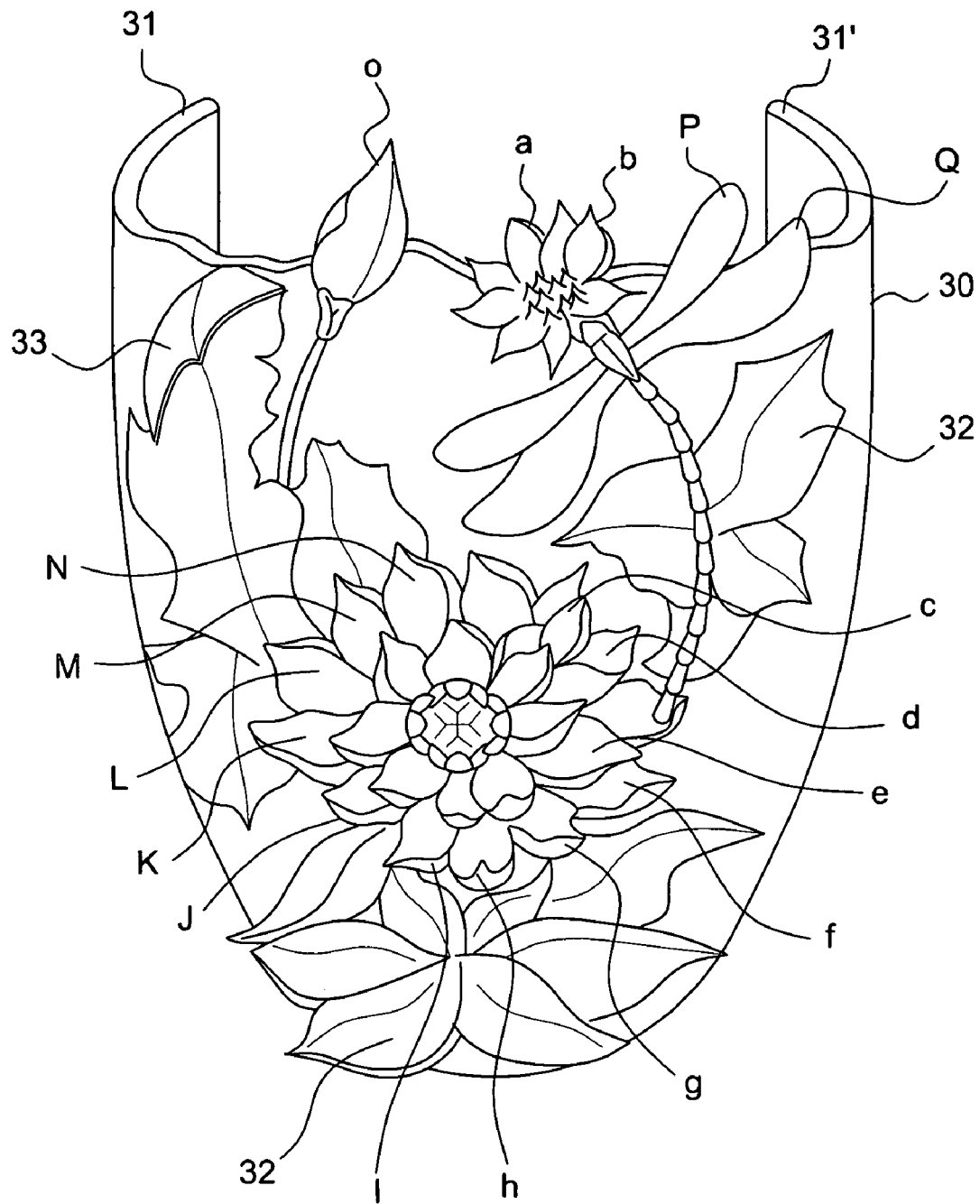
FIG. 3 is a perspective view of a third preferred embodiment of a poly night light display unit design to illustrate the three-dimensional curvature, configuration, shape, overlay, underlay, and/or double effects made possible by the invention, which cannot made by the conventional plastic injection process.

From FIG. 3, it can be easily to understand the poly night light can not only feature a certain degree of softness material to overcome impacts, but it also can be made with very pretty and outstanding three-dimensional designs such as the flower and leaves of FIG. 3. The flower has a plurality of curved pieces (from c to n) and the display also includes further floral pieces (a) (b) and dragonfly's wing (p) (Q). None of these pieces can be made by the conventional injection process. Moreover, the poly display unit (32) can use hand painting to provide details of the colors and dedicated art on its surface. Even when the light is not turned on, it already present nice and elegant art to consumers. The poly display unit has two curvatures (31) (31') which cannot be obtained from traditional plastic injection because its curvature is way over the limitation of the injection process.

As shown in FIG. 1, the lamp holder (9) may have different designs, configurations, and standards to fit an incandescent bulb, neon bulb, LED(s), organic electro-luminescent element(s) or a preferable combination of such light means. In FIG. 1, the lamp holder (9) has a prong means (5), control means (6), housing (4) (4'), connector means (3) and lamp base receptacle (8") to receive the bulb base (8'). The bulb (8) is illustrated as an incandescent light. The poly display unit (1) has a plurality of window(s), cut-out(s), and opening(s) to allow the light beams to be seen by a viewer. The functions may incorporate those of other optics kits, which may include optical fiber, filter(s), stencil(s), cut-out(s), window(s), overlays, underlays, mask(s), lenses, inks, painting, glue, or any related optic related elements which can allow the visible light beams to provide an expected image.

As shown in FIG. 6, a lamp holder (61) includes sealed-unit (61') which contains all the LED related parts, circuit (63), PCB (61"), control means (not shown), and prong means (62) sealed within a strict anti-flammable plastic case (61') with the lamp holder (62). This allows the LED light means with lamp holder (62) with sealed-unit (61') to supply power from a power source (not shown) though the sealed-unit (61') to cause the plurality of LEDs (64) (64') to provide illumination in two directions as described in co-pending U.S. patent application Ser. No. 11/255,981. The one or more than one LED supplies light to a fiber optics bundle (68) though an adaptor (66) into which one end of fiber optics bundle fits tightly and the other end is provided with the LED(s) to let all light beams from the LEDs to pass though the adaptor into the fiber optics bundle and fiber optics strings (6 a to 6 L) for illumination. The fiber optics strings (6a to 6L) are well installed on the poly display unit (60) surface's opening(s), window(s) or cut-out(s). The poly display unit (60) with a plurality of window(s), cut-out(s), and opening(s) allows the fiber optics string to be easily installed and seen by a viewer.

As shown in FIG. 7, the connector my be a removable type. The connector (76) has a central channel (73) to allow the fiber optics bundle (not shown) to pass though from top to bottom to connect with an inner adaptor (not shown) to obtain the LED(s) light beams. The connector has a neck (74) to receive the clip means (not shown). The connector's base (75) has a certain length to allow the connector to be tightly fixed on the LED lamp holder (70). The lamp holder (70) has more than one opening, window, and/or cut-out to allow installation of more than one light source, sensor means, control means, or other control device available in the conventional marketplace.

Figure 8:
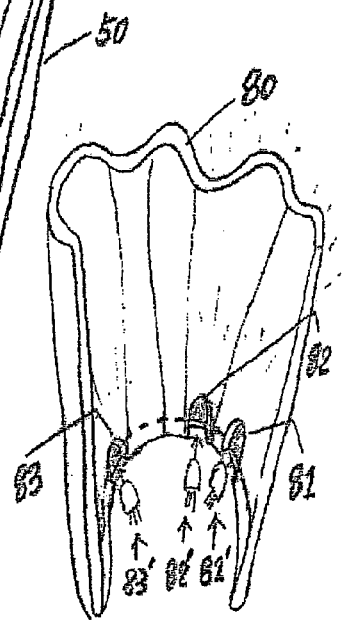
FIG. 8 is a perspective view of a further embodiment of a poly night light with built-in LED(s) within the poly display unit body to achieve a desired light-medium property and enable the light beam to be seen by viewing the display unit surface.

As shown in FIG. 8, the light means can be installed on a poly display unit (80) that has the property of a light-medium which can allow the light travel within the poly material so that the light be seen on the light-medium surface. The groove (s), hole(s), window(s) are properly arranged on a bottom of the poly display unit (80). It is not preferred to use the hole(s), opening(s), or cut-out(s) for this application because they can be seen on the front side. This preferred embodiment may be incorporated with a sealed-unit so it will be very simple and low in cost.

As shown in FIG. S, the sealed-unit (S2) (S12) (S22) has a pre-designed opening (S2') (S12') (S22') to allow the universal type of sealed-unit (S2) (S12) (S22) to fit into the opening (S2') (S12') (S22'). A conventional market method can be used to fasten the base (S1) (S10) (S20), which may for example be assembled to the said night light by screws (S23) (S24), welding, sonic sealing, glue, solvent, a rivet, a catcher, or equivalent attachment means or method available in the market to allow the sealed-unit be fixed in position. The sealed-unit (S2) (S12) (S22) preferable uses a plastic with certain thickness to pass the 94-V-0 flammable grade and meet safety standards, while all other housing parts (S1) (S10) (S20) are without any limitation because they do not touch live wires. The base (S1) (S10) (S20) can be any shape, configuration, design, curvature, thickness, material, and/or dimension with built-in or separated receptacle means. The sealed-unit has an LED related circuit, control means, and prong means disposed within, and can be designed to be super slim or wider and thicker but smaller, depending on the market requirement. For convenience, a desired unit can also be made which can fit into a different base shape such as a boat shape (S1), tube shape (S10), and/or rectangular shape (S20) for different night light applications.

The boat base (S1) has an opening (S2') to allow the sealed-unit (S2) to fit into the space. The sealed-unit (S2) has an LED related circuit (S8), components (S9) thereof, and prong means (S7) (S7') sealed within the case (S2). The top of the case has two LEDs (S3) (S4) which are connected with the inner circuit (S8). None of the LEDs' electric legs can be touched to make sure the kid finger will not touch these live wires to cause a dangerous condition. The LED (S5) can be use the conductive wires (S6) to supply electricity far away the unit's housing (S2) for other illumination arrangements. The LEDs (S3) (S4) also fit into the base opening (S3') (S4') and a wall (S2") covers the LEDs after assembly with the base housing. After the assembly, The LED light beams can pass though the base's opening area (S) to provide good light effects to the upper display unit. From the tube base (S10) has the opening (S12') to allow the sealed-unit (S12) to fit into with two or more LED on desired position and orientation and wiring arrangement so can allow the light beams emit out from the base top opening (S18) and lower window (S18') for desired illumination. The rectangular base (S20) is especially suitable for a surface light arrangement. The LED spot light beams diffuse though a light-medium (S28) to allow a majority of light beams to be seen by a viewer from the light-medium (S28) surface. The viewer will not see any hot spot of LED light brightness but rather will see a very soft and even photometric area light for special illumination. The rectangular base (S20) has an opening (S22') to allow the sealed-unit (S22) to be fit into tightly into the rectangular housing (S20) with glue, solvent, or other adhesive means, sonic means, welding means, catch means, or hook means. The LED will fit into the light-medium's thickness to get the best result.

It will be appreciated that the invention is not to be limited by the description, embodiments, prior art, or other disclosures, except in accordance with the appended claims. Any equivalent function, replacement, alternative process, treatments, experiments, and arrangements permitted by the appended claims should be considered to belong within the scope of the current invention.

The invention claimed is:

1. A polyester night light, comprising:
   at least one display unit made of an un-saturated polyester resin (UPR) compound having a three-dimensional configuration;
   at least one clip means sealed within the UPR compound material for clipping said display unit onto a lighting fixture;
   at least one light means in said lighting fixture for illuminating said display unit; and
   at least one holder in said lighting fixture for holding said light means such that light from said light means passes through said display unit made of UPR to enable the light to be seen by viewing a surface of the display unit when said display unit is clipped onto the lighting fixture, said holder including prong means for supplying power to said light means.

2. The polyester night light of claim 1, wherein a material of said clip is selected from the group consisting of plastic, metal, wood, pottery, and porcelain.

3. The polyester night light of claim 1, wherein said light means includes at least one lighting element selected from the group consisting of an incandescent bulb, a neon bulb, an LED, multiple LEDs, and an organic electro-luminescent element.

4. The polyester night light of claim 1, wherein the polyester night light is arranged to pass quality tests including at least one of a drop test, a continuously-on test, an accumulated temperature test, a pulling test, and an oven test.

5. The polyester night light of claim 1, further comprising means for varying a lighting effect provided by said light means, said means for varying a lighting effect selected from the group consisting of an optical fiber, filter, stencil, cut-out, window, overlay, underlay, mask, lens, ink, painting, glue, and combinations said fiber, filter, stencil, cut-out, window, overlay, underlay, mask, lens, ink, painting, and glue.

6. The polyester night light of claim 1, wherein said UPR resin compound is has a predetermined degree of softness sufficient to provide cushioning for elements or said night light.

7. The polyester night light of claim 1, wherein said display unit includes a plurality of windows, cut-outs, or openings through which light beams from said light means are seen by a viewer.

8. The polyester night light of claim 1, wherein said light means includes at least one LED, and said holder includes a sealed unit containing said prong means and all circuitry for driving said LED, said sealed unit being anti-flammable.

9. The polyester night light of claim 1, wherein said clip is molded into said display unit.

10. The polyester night light of claim 1, wherein said display unit is hand-painted in color.

11. The polyester night light of claim 1, wherein said display unit is spray-painted in color.

12. The polyester night light of claim 1, wherein said configuration of said display unit corresponds to a configuration of tooling into which said UPR compound is poured.

13. The polyester night light of claim 1, wherein said UPR compound includes materials added to obtain at least one of a desired softness, clearance, thickness, curing time, and durability.

* * * * *